United States Patent
Murakami et al.

(10) Patent No.: US 7,083,320 B2
(45) Date of Patent: Aug. 1, 2006

(54) KNEADING APPARATUS AND METHOD, INCLUDING SELECTABLE SUPPLY PORTS, FOR KNEADING RUBBER OR RUBBER COMPOSITIONS

(75) Inventors: Masao Murakami, Takasago (JP); Norifumi Yamada, Takasago (JP); Kimio Inoue, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 11/050,723

(22) Filed: Feb. 7, 2005

(65) Prior Publication Data
US 2005/0127560 A1 Jun. 16, 2005

Related U.S. Application Data

(62) Division of application No. 10/293,337, filed on Nov. 14, 2002, now Pat. No. 6,890,091.

(30) Foreign Application Priority Data

Nov. 15, 2001 (JP) .............................. 2001-349733
Dec. 28, 2001 (JP) .............................. 2001-399291

(51) Int. Cl.
*B29B 7/60* (2006.01)

(52) U.S. Cl. ........................................ 366/76.6; 386/85

(58) Field of Classification Search ...... 366/76.1–76.6, 366/76.9–76.93, 83–85, 181.1–181.3, 183.1–183.2, 366/297, 300, 301
See application file for complete search history.

(56) References Cited

U.S. PATENT DOCUMENTS

| | | | |
|---|---|---|---|
| 3,239,878 A | 3/1966 | Ahlefeld, Jr. et al. | |
| 3,583,680 A | 6/1971 | Aust et al. | |
| 3,684,252 A * | 8/1972 | Nissle et al. | 366/172.1 |
| 3,704,866 A | 12/1972 | Mosher et al. | |
| 3,966,857 A | 6/1976 | Charlton et al. | |
| 3,979,107 A | 9/1976 | Lesk | |
| 4,110,843 A * | 8/1978 | Skidmore | 366/76.4 |
| 4,124,307 A | 11/1978 | Anisic | |
| 4,124,308 A | 11/1978 | Sokolow | |

(Continued)

FOREIGN PATENT DOCUMENTS

DE 2638292 A1 3/1977

(Continued)

OTHER PUBLICATIONS

Patent Abstracts of Japan, JP 11-262945, Sep. 28, 1999.

*Primary Examiner*—Charles E. Cooley
(74) *Attorney, Agent, or Firm*—Oblon, Spivak, McClelland, Maier & Neustadt, P.C.

(57) ABSTRACT

A continuous kneading apparatus and method are provided wherein discharge ports are provided at a plurality of positions of the barrel to discharge a kneaded product, and one of the plurality of the discharge ports is selected according to a desired kneading condition so as to discharge the kneaded product from only the selected discharge port. Another continuous kneading apparatus and method are provided wherein a plurality of charging ports are provided at a plurality of positions of the barrel to supply a material to be kneaded into the chamber, and one of the plurality of charging ports is selected according to a desired kneading condition. The kneading apparatuses and methods permit adjustment and control of a viscosity and a dispersion degree of a compounding agent over a wide range, and continuous kneading to achieve significant rationalization of a process for producing a kneaded product.

8 Claims, 11 Drawing Sheets

U.S. PATENT DOCUMENTS

| | | | |
|---|---|---|---|
| 4,194,842 A * | 3/1980 | Puthawala | 366/297 |
| 4,275,967 A * | 6/1981 | Erbach et al. | 366/149 |
| 4,310,251 A | 1/1982 | Scharer et al. | |
| 4,344,710 A * | 8/1982 | Johnson et al. | 366/76.2 |
| 4,744,669 A | 5/1988 | Kowalczyk et al. | |
| 5,273,419 A | 12/1993 | Mayer et al. | |
| 5,358,693 A * | 10/1994 | Brinkmann et al. | 366/76.6 |
| 5,437,826 A * | 8/1995 | Martinello et al. | 366/85 |
| 5,505,591 A * | 4/1996 | Tynan | 366/85 |
| 5,603,564 A | 2/1997 | Zimmermann | |
| 5,908,592 A * | 6/1999 | Kimura et al. | 366/76.1 |
| 5,947,593 A | 9/1999 | Inoue et al. | |
| 6,682,213 B1 | 1/2004 | Inoue et al. | |
| 7,004,616 B1 * | 2/2006 | Murakami et al. | 366/76.6 |
| 2003/0090955 A1 | 5/2003 | Murakami et al. | |
| 2003/0128624 A1 | 7/2003 | Inoue et al. | |
| 2004/0094862 A1 * | 5/2004 | Sturm et al. | 425/204 |
| 2006/0034147 A1 * | 2/2006 | Murakami et al. | 366/76.6 |

FOREIGN PATENT DOCUMENTS

| | | | |
|---|---|---|---|
| EP | 1312452 A1 | | 5/2004 |
| JP | 55-35960 | | 3/1980 |
| JP | 56-115625 | | 9/1981 |
| JP | 62-33621 | | 2/1987 |
| JP | 1-130916 | | 5/1989 |
| JP | 4-74608 | * | 3/1992 |
| JP | 10-6330 | | 1/1998 |
| JP | 11-262945 | | 9/1999 |

* cited by examiner

KNEADING APPARATUS AND METHOD, INCLUDING SELECTABLE SUPPLY PORTS, FOR KNEADING RUBBER OR RUBBER COMPOSITIONS

BACKGROUND OF THE INVENTION

1. Field of the Invention

The present invention relates to an apparatus and method for kneading rubber or a rubber composition, for the purpose of masticating rubber to improve fluidity and workability, and the purpose of kneading a material to be kneaded, which contains rubber and various compounding agents.

2. Description of the Related Art

In producing a kneaded product of a rubber composition comprising rubber and various compounding agents, particularly in producing a tire rubber compound mainly comprising natural rubber, a batch system is frequently used, in which predetermined amounts of raw materials are intermittently kneaded one time each. In this case, batch-system kneading is repeated until extrusion workability and a degree of dispersion of a compounding agent reach desired levels, i.e., desired levels of viscosity and of dispersion are obtained. This kneading step is generally referred to as a "re-milling step", and uses a batch-system kneading apparatus such as an internal mixer or the like.

However, in kneading by using such a batch-system kneading apparatus, the kneaded product must be transferred to an extruder from the kneading apparatus by using a transport device after the kneading step, and must be molded in a desired shape, thereby causing the need for a step of transferring a bulk kneaded material. Therefore, the apparatus is easily complicated and increased in size, and a manual work by a worker is required, failing to achieve power saving. Also, in kneading by the batch-system kneading apparatus, it is necessary to prevent an excessive increase in temperature during kneading in order to prevent deterioration and improve a kneading efficiency. Therefore, the bulk kneaded material after kneading is formed in a sheet and cooled, and again subjected to a re-milling step several times. The re-milling step is repeated until the viscosity is decreased to a desired level, and in some cases, the re-milling step is performed about 5 times. This is undesirable from the viewpoint of improvement in productivity.

On the other hand, from the viewpoint of improvement in productivity, a method of continuously kneading a rubber composition is disclosed (Japanese Unexamined Patent Application Publication No. 11-262945). This uses, for kneading rubber, a double-screw kneading extruder, which is a typical kneading extruder for plastic compositions. The double-screw kneading extruder is provided with a rubber charging port to which a rubber supply extruder is further connected so that a rubber composition is continuously supplied and continuously kneaded by the double-screw kneading extruder.

However, in the continuous kneading apparatus disclosed in the above publication, a kneading state, i.e., a viscosity level and a dispersion level of a compounding agent, can be controlled in only a limited range which permits control by a means for controlling the rotational speed of the double-screw kneading extruder, or the like. The viscosity level and the dispersion level cannot be easily controlled in such a wide range as controlled by a batch-system kneading apparatus. The shape of a screw can be changed so that the kneading apparatus can be widely applied to rubber compositions having various viscosities. However, the screw of the double-screw kneading extruder comprises a segmented kneading blade (a rotor segment, kneading disk, a screw segment, or the like), which is combined with a splined shaft, and thus in a large-size equipment, much labor and time are required for changing the shape or configuration the screw.

SUMMARY OF THE INVENTION

In consideration of the above-described situation, an object of the present invention is to provide a kneading apparatus and kneading method which are capable of adjusting and controlling a viscosity and a dispersion degree of a compounding agent over a wider range in producing a kneaded product of a rubber composition, and which permit continuous kneading to permit significant rationalization of a kneaded product producing process, i.e., an improvement in productivity, and simplification, power saving and cost reduction of the producing process.

In order to achieve the object, according to the present invention, a kneading apparatus for kneading by fluidizing a material to be kneaded under a shearing force to obtain a kneaded product in a desired kneaded state comprises a barrel having a cylindrical cavity chamber; a double-screw screw set rotating in the chamber to knead the material to be kneaded under a shearing force and extrude the material to be kneaded to the downstream side; a plurality of kneading blades combined with the screw set, for kneading the material to be kneaded in a wedge-shaped space between the inner wall of the chamber and said screw set and in a tip clearance; a charging port provided at one end of the barrel, for supplying the material to be kneaded into the chamber; discharge ports provided at a plurality of positions of the barrel, for discharging the kneaded product; and a discharge position selecting means for selecting one of the plurality of discharge ports so as to discharge the kneaded product from only a selected discharge port.

In this construction, a plurality of kneading portions, respectively formed by the barrel and the kneading blades, may be provided in plural steps, and the discharge ports may be respectively provided on the downstream sides of the kneading portions in the extrusion direction of the kneaded product. Furthermore, the discharge position selecting means enables the material to be discharged from the discharge port at a predetermined position in the axial direction of the screw. Namely, even in a continuous kneading apparatus, the number of the steps of kneading portions through which the material to be kneaded is passed can be selected according to the desired viscosity level and the desired dispersion level of a compounding agent. Therefore, in an apparatus for producing a kneaded product, the viscosity and the dispersion level of a compounding agent can be adjusted and controlled in a wide range. It is also possible to achieve a kneading apparatus which permits continuous kneading, and significant rationalization of a process for producing a kneaded product, i.e., an improvement in productivity, and simplification, power saving and cost reduction of the producing process.

Since the charging port is provided at one end of the barrel, the distance between the rotation-driving portion of the screw set and a maximum-load position can be decreased, thereby suppressing damage to the screw set.

The kneading apparatus according to the present invention can further comprise a lubricant supply means for supplying a small amount of lubricant to each of the kneading portions respectively formed by the chamber and the kneading blades, and a lubricant supply selecting means for selecting the kneading portions so that the lubricant is supplied to each of only the kneading portions on the downstream side of the discharge port, which is selected to discharge the kneaded product, in the extrusion direction of the kneaded product.

In this construction, a small amount of lubricant is supplied to the kneading portions on the downstream side of the selected discharge port, thereby preventing direct metal contact between the chamber inner wall and each of the kneading blades, or between the respective kneading blades.

In the kneading apparatus according to the present invention, a rotor segment comprising two or three helical blades can be used for each of the kneading portions.

In this construction, kneading can be efficiently performed in the wedge-shaped space between the vicinity of the top of the plurality of helical blades and the chamber inner wall, and in the tip clearances.

In the kneading apparatus, according to the present invention, the tip clearances can vary in size in the axial direction or the circumferential direction of the screw set.

In this construction, a strong shearing force is applied to the material to be kneaded in the vicinity of the tip of the blade with a narrow tip clearance and in the narrow tip clearance, while passage of the material to be kneaded is accelerated in a wide tip clearance. Therefore, a shearing function can be easily and uniformly applied to the material to be kneaded during transfer of the material to be kneaded to promote plasticization and melting of the material to be kneaded, and kneading and dispersive mixing of various compounding agents such as a filler, additives, and the like, thereby permitting effective use of the entire length of the screw set. Therefore, the material to be kneaded is less localized in the chamber, thereby decreasing a mechanical load applied to the screw set. Furthermore, the kneading blades with a narrow tip clearance have the function to scrape out the material to be kneaded, which adheres to the chamber inner wall, to improve releasing properties of the material to be kneaded in the kneading portions, thereby preventing the material to be kneaded having an adhesive property to a metal from remaining in the kneading portions.

In the kneading apparatus according to the present invention, a cooling path can be provided around the chamber.

Further, according to the present invention, a kneading method by using the kneading apparatus as described above comprises a supply step of supplying a material to be kneaded into the chamber; a kneading step of kneading the material to be kneaded in a wedge-shaped space formed between said kneading blade and the inner wall of said chamber, and in a tip clearance; and a discharge step of discharging the kneaded material from one of said plurality of discharge ports, which is selected according to a desired kneading conditions.

In this construction, the material to be kneaded can be continuously kneaded in the kneading apparatus, and the kneaded material can be discharged at a predetermined position in the longitudinal direction of the barrel according to a desired kneading condition. Therefore, the length of passage in the barrel can be selected according to the desired viscosity level and the desired dispersion level of a compounding agent. Thus, in producing a kneaded product, viscosity and a dispersion degree of a compounding agent can be adjusted and controlled over a wide range without a change of the screw, and continuous kneading can be performed to permit significant rationalization of a process for producing a kneaded product, i.e., improvement of productivity, and simplification, power saving and cost reduction of the producing process. Therefore, the kneading method is effective for a large-size equipment.

In the kneading method according to the present invention, a small amount of lubricant can be supplied to a kneading portion formed by the chamber and the kneading blade and positioned on the downstream side of the selected discharge port in the extrusion direction of the kneaded material.

In this construction, a small amount of lubricant is supplied to the kneading portion on the downstream side of the selected discharge port, thereby preventing direct metal contact between the chamber inner wall and the kneading blade or between the respective kneading blades.

The method according to the present invention can be preferably applied to kneading of rubber or rubber composition.

In order to achieve the object, according to another aspect of the present invention, a kneading apparatus for kneading by fluidizing a material to be kneaded under a shearing force to obtain a kneaded product in a desired kneaded state comprises a barrel having a cylindrical cavity chamber; a double-screw screw set rotating in the chamber to knead the material to be kneaded under a shearing force and extrude the material to be kneaded to the downstream side; a plurality of kneading blades combined with the screw set, for kneading the material to be kneaded in a wedge-shaped space between the inner wall of the chamber and the screw set and in a tip clearance; charging ports provided at a plurality of positions of said barrel, for supplying the material to be kneaded into the chamber; and a feeder for supplying the material to be kneaded through a selected one of said plurality of charging ports.

In this construction, the material to be kneaded is kneaded in a region from the selected charging port to the end. Namely, even in continuous kneading, the length of passage of the material to be kneaded through the chamber can be changed by appropriately selecting one of the charging ports, and an amount of kneading work can be imparted to the material to be kneaded according to a desired viscosity level and a desired dispersion level of the compounding agents, to obtain a desired kneading condition. It is thus possible to provide a kneading apparatus which is capable of adjusting and controlling the viscosity and the dispersion level of the compounding agents over a wide range in producing a kneaded product, and which permits continuous kneading, and significant rationalization of production of the kneaded product, i.e., an improvement of productivity, and simplification, power saving and cost reduction of the producing process.

In the kneading apparatus according to the present invention, a cooling path can be provided around the chamber.

Further, according to the present invention, a kneading method by using the kneading apparatus as described above comprises a supply step of supplying a material to be kneaded into the chamber through one of said plurality of charging ports, which is selected according to a desired kneading condition; a kneading step of kneading the material to be kneaded under a shearing force in a space between the screw set and the inner wall of the chamber, and extruding the material toward the downstream side; and a discharge step of discharging a kneaded product from a downstream end of the barrel.

In this construction, the material to be kneaded is kneaded in a region from the selected charging port to the end. Namely, even in continuous kneading, the length of passage of the material to be kneaded through the chamber can be changed by appropriately selecting one of the charging ports, and an amount of kneading work can be imparted to the material to be kneaded according to a desired viscosity level and a desired dispersion level of the compounding agents, to obtain a desired kneading condition. It is thus possible to provide a kneading method which is capable of adjusting and controlling the viscosity and the dispersion level of the compounding agents over a wide range in producing a kneaded product, and which permits continuous kneading, and significant rationalization of production of the kneaded product, i.e., an improvement of productivity, and simplification, power saving and cost reduction of the producing process.

In the kneading method according to the present invention, some of the charging ports, which are positioned on the downstream side of the charging port selected to supply the material to be kneaded into the extrusion direction, can be selected to supply a predetermined compounding agent to the chamber and to mix the compounding agent with the material to be kneaded.

In this construction, even in continuous kneading, the viscosity and the dispersion level of the compounding agents can be controlled over a wide range, and when the compounding agents are preferably mixed with the material to be kneaded in a predetermined state in the course of kneading, this operation can easily be performed.

The method according to the present invention can be preferably applied to kneading of rubber or rubber composition. In this case, the supply step can preferably comprise supplying the material to be kneaded, which is adjusted to a temperature of 65° C. or less.

In this construction, a shearing force can effectively be applied to the material to be kneaded, thereby efficiently decreasing the viscosity and achieving a high efficiency of kneading. Namely, when the material to be kneaded is kept at a temperature of 65° C. or less during kneading, a stable-quality kneaded product can be efficiently produced without a decrease in the efficiency of kneading.

In the kneading method of kneading rubber or rubber composition according to the present invention, the supply step can comprise supplying the material to be kneaded, which is formed in a ribbon, a strip ribbon, or a chip.

In this construction, the material to be kneaded can easily be supplied in a quantitative manner through the charging port. Therefore, it is possible to prevent the occurrence of large variations in quality and physical properties of the kneaded product due to variations in supply of the rubber and the other compounding agents to the kneading extruder.

In the kneading method according to the present invention, the supply step can comprise supplying the material to be kneaded, by using a quantitative supply means.

In this construction, variations in supply of the material to be kneaded to the kneading apparatus can be decreased to suppress variations in quality and physical properties of the kneaded product.

DETAILED DESCRIPTION OF THE PREFERRED EMBODIMENTS

Figure 1:
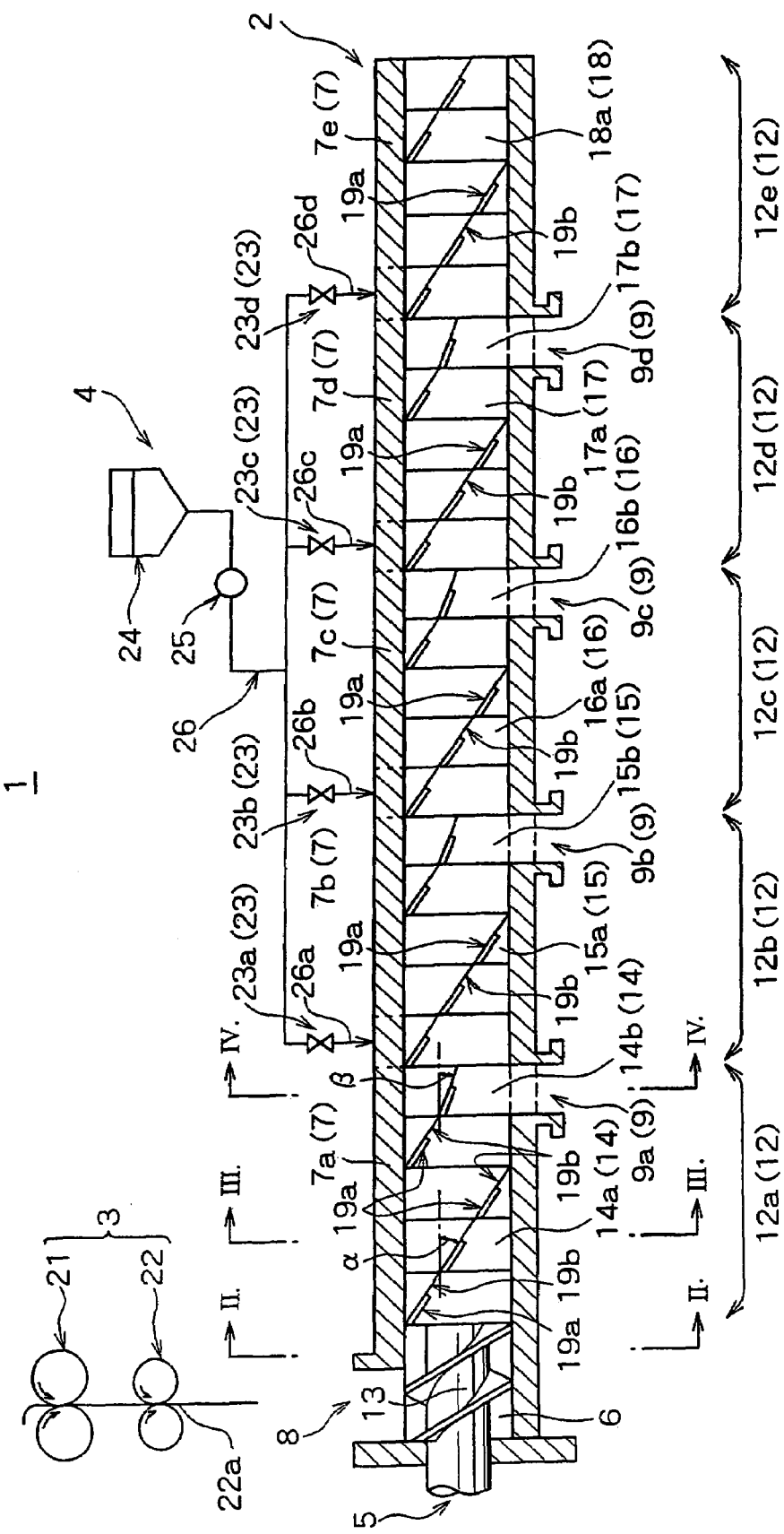
FIG. 1 is a schematic sectional side view of a kneading apparatus according to an embodiment of the present invention.

An embodiment of the present invention will be described below with reference to the drawings. FIG. 1 is a schematic sectional side view showing a rubber composition kneading apparatus 1 according to this embodiment. As shown in FIG. 1, the kneading apparatus 1 comprises a codirectional rotation-engagement type of double-screw kneading extruder 2, a rubber feeder 3 for supplying a rubber material to be kneaded to the double-screw kneading extruder, and a lubricant supply means 4 for supplying a small amount of process oil serving as a lubricant.

The double-screw kneading extruder 2 comprises a pair of screw sets 5, and a barrel 7 having a chamber 6 serving as a cylindrical cavity in which the screw sets 5 are rotated. The pair of screw sets 5 is arranged in parallel in the axial direction so as to overlap with each other, as shown in a side view of FIG. 1. Also, the pair of screw sets 5 is connected to a driving portion (positioned on the left side of the drawing) not shown in the drawing outside the barrel 7 so as to be rotated in a same direction. The barrel 7 comprises the chamber 6 formed as a cylindrical cavity having a cocoon-like sectional shape, the pair of screw sets 5 being contained in the chamber 6 (refer to a sectional view of FIG. 2, taken along line 2—2 in FIG. 1).

Furthermore, a charging port 8 (hopper) is provided at an end of the barrel 7, for supplying, into the chamber 6, the material to be kneaded, which comprises rubber or a rubber and various compounding agents such as a filler, additives, and the like. The material to be kneaded, which is supplied from the rubber feeder 3 described below through the charging port 8, is extruded to the right side of the drawing in the axial direction, and continuously kneaded by rotation of the screw sets 5 in the chamber 8.

The barrel 7 also comprises discharge ports 9 (9a, 9b, 9c, 9d) respectively provided on the downstream sides of kneading portions 12 (12a, 12b, 12c, 12d, 12e), which will be described below, in the extrusion direction. As shown in a sectional view of FIG. 4, taken along line IV—IV in FIG. 1, each of the discharge ports 9 is opened downward so that the kneaded material is discharged downward when being extruded to the discharge port position.

Figure 5:
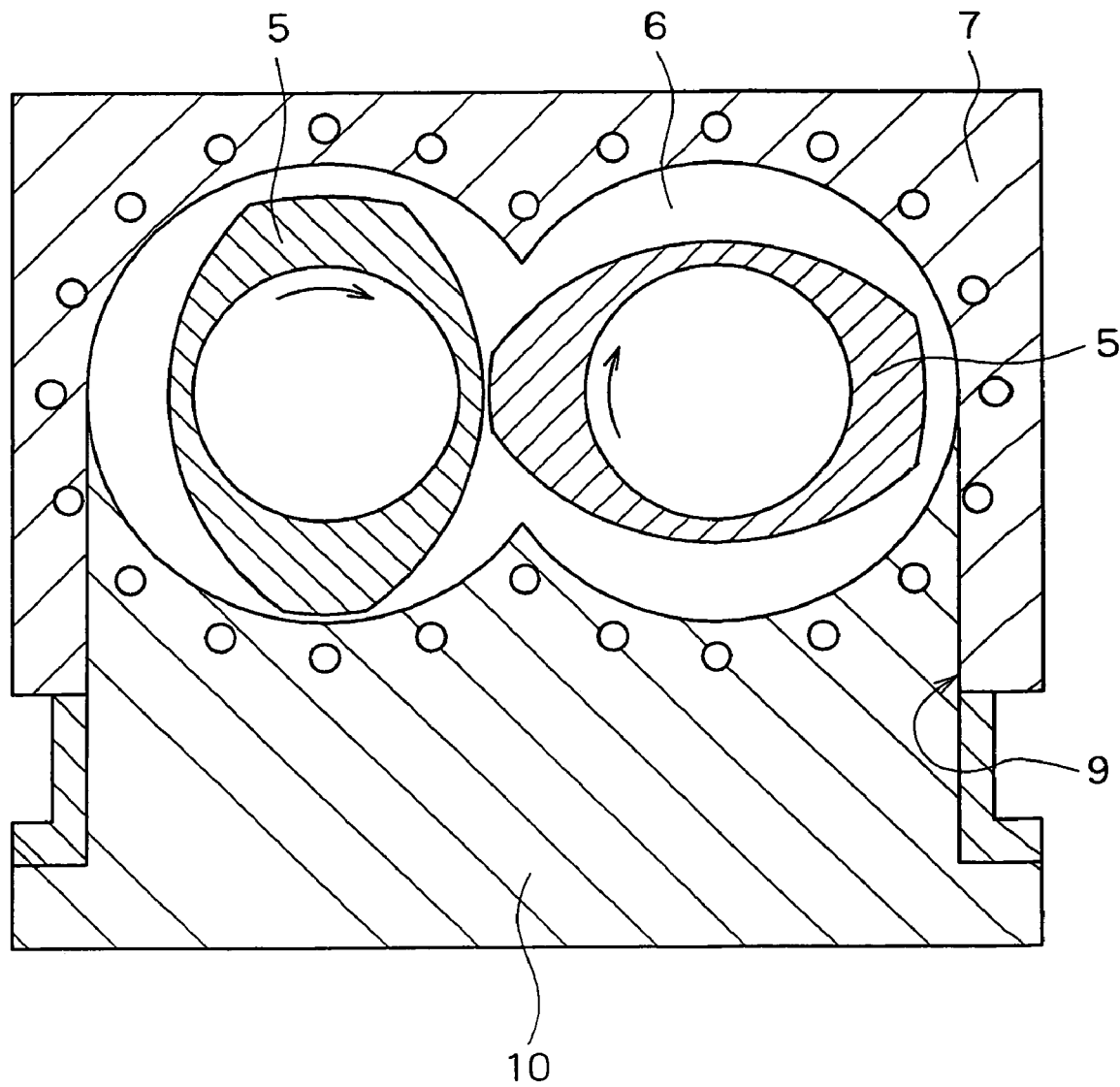
FIG. 5 is a sectional view showing a state in which a closing member is inserted into a discharge port in a kneading apparatus according to an embodiment of the present invention.

In each of the discharge ports 9, a closing member 10 serving as a discharge position selecting means is inserted into or removed from to switch between closing and opening, as shown in a sectional view of FIG. 5. In the discharge port 9 in which the closing member 10 is inserted, the kneaded material is not discharged, while in the discharge port 9 from which the closing member 10 is removed to open the discharge port 9, the kneaded material is discharged. The discharge position selecting means will be described below.

As shown in each of the sectional views of FIG. 2 (taken along line II—II), FIG. 3 (taken along line III—III), and FIG. 4 (taken along line IV—IV), the barrel 7 comprises a plurality of cooling liquid paths 11 provided in the axial direction of the screw sets 5 (simply referred to as the "axial direction" hereinafter) to, surround the chamber 6. By passing a cooling medium such as cooling water through the cooling liquid paths 11, the material to be kneaded is prevented from being heated to a high temperature during continuous kneading through the barrel 7.

The barrel 7 comprises a plurality of units (7a, 7b, 7c, 7d, and 7e), which are combined in the axial direction respectively corresponding to the kneading portions 12a to 12e. Although FIG. 1 shows a state in which an end of the barrel 7 (the end of the barrel unit 7e) is open to the air so that the kneaded material is discharged as a block material, a die may be connected to the end so as to discharge the kneaded material molded into a predetermined sectional shape.

Each of the screw sets 5 comprises a screw segment 13 positioned directly below the charging port 8, and a plurality of kneading blades (14, 15, 16, 17, and 18), which is combined in the axial direction.

Figure 2:
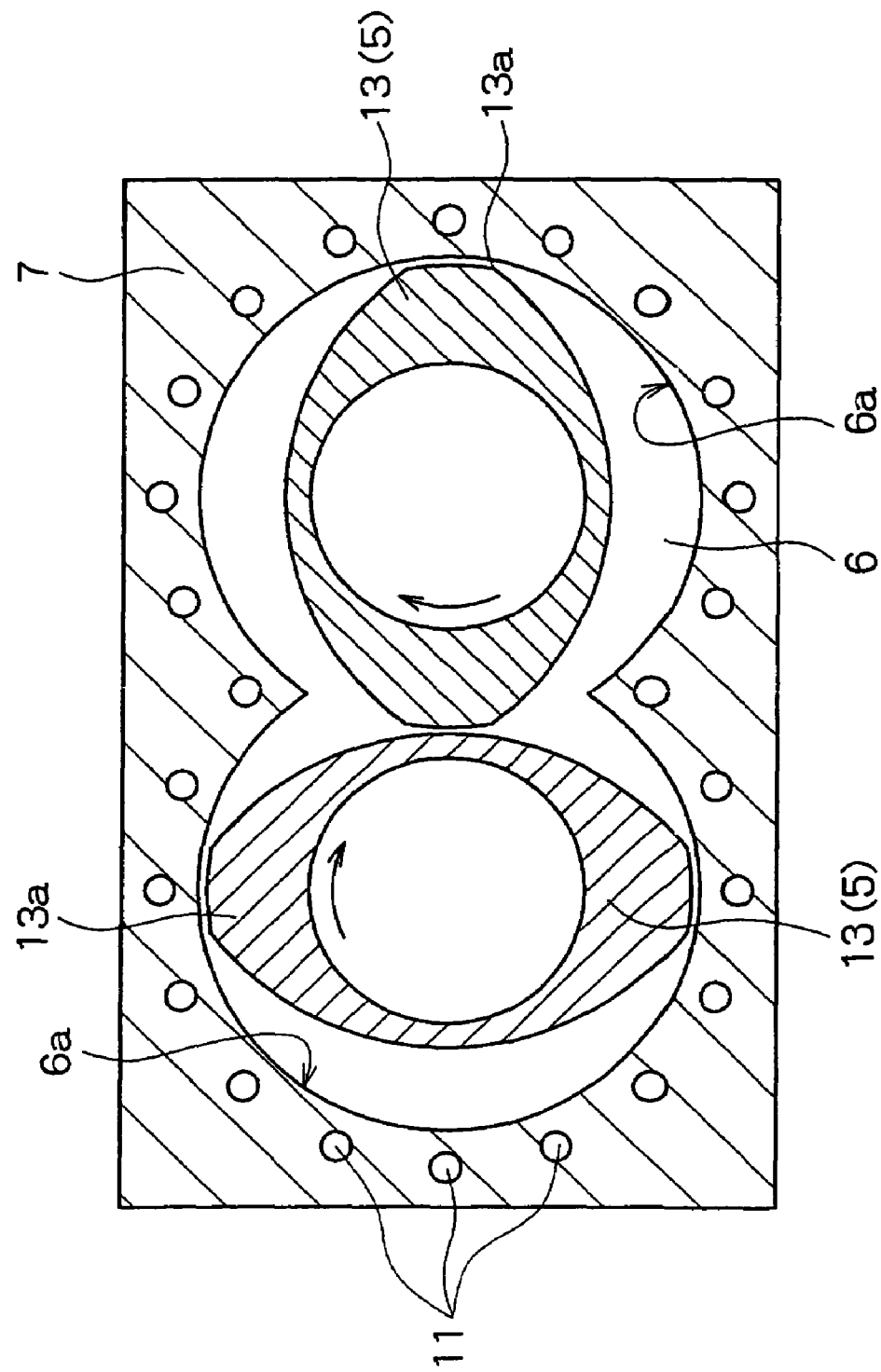
FIG. 2 is a sectional view taken along line II—II in FIG. 1.

As shown in FIG. 2 (sectional view taken along line II—II), the screw segment 13 comprises a double-thread helical blade provided so that the tip 13a of the helical blade is brought near to the chamber inner wall 6a to form a narrow clearance, thereby improving biting of the supplied material to be kneaded.

The kneading blades (the first blade 14, the second blade 15, the third blade 16, the fourth blade 17, and the fifth blade 18) combined in the axial direction respectively form the kneading portions 12 (the first kneading portion 12a, the second kneading portion 12b, the third kneading portion 12c, the fourth kneading portion 12d, and the fifth kneading portion 12e) together with the barrel units 7a to 7e.

Each of the kneading blades 14 to 18 comprises a plurality of rotor segments (14a, 14b, etc.) each comprising two helical blades. Namely, the first kneading blade 14 comprises four rotor segments 14a having a large twist angle and one rotor segment 14b having a small twist angle. Similarly, each of the second to fourth kneading blades (15 to 17) comprises the same rotor segments (four rotor segments 15a, 16a or 17a with a large twist angle, and one rotor segment 15b, 16b or 17b with a small twist angle). The fifth kneading blade 18 comprises five rotor segments with a large twist angle. The twist angle represents an angle formed by projecting, on a plane parallel to the axis, the angle of a tangent line to the tip of a helical blade, which is formed to axially move forward along the circumferential direction of the screw sets 5, with respect to the axial direction (FIG. 1 shows the large twist angle $\alpha$ of the rotor segments 14a, and the small twist angle $\beta$ of the rotor segment 14b).

Figure 6:
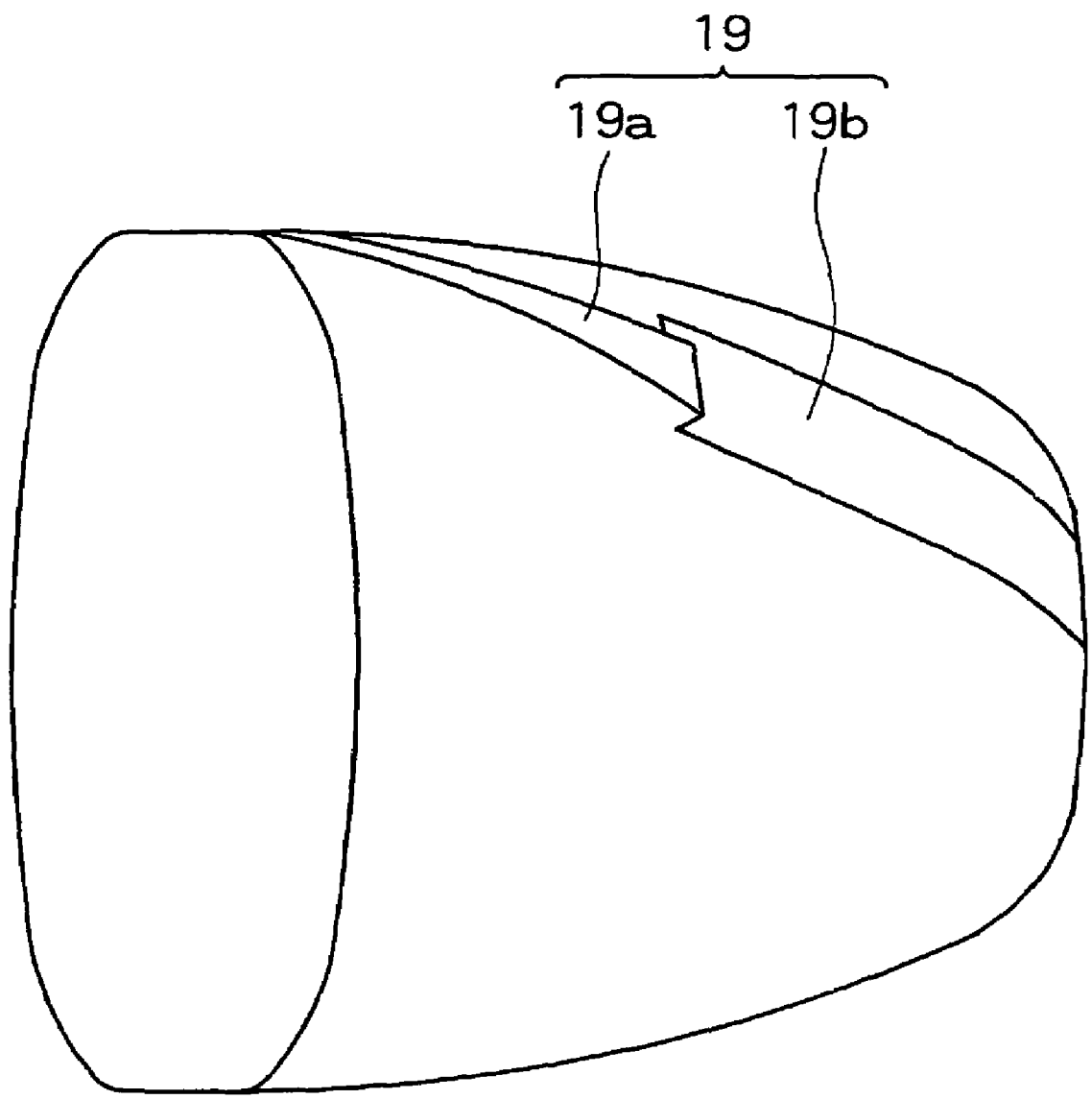
FIG. 6 is a schematic view showing a rotor segment.

FIG. 6 is a schematic drawing showing a rotor segment (for example, the rotor segment 14a). As shown in FIG. 6, the tip 19 of a helical blade comprises a high-level tip portion 19a and a low-level tip portion 19b, which are separated in the axial direction. FIG. 6 shows only one of the two helical blades.

Again returning to FIG. 1, the rotor segments (14a, 15a, 16a, 17a, and 18a) with a large twist angle of the respective kneading blades (14 to 18) are combined in the axial direction so that the helical blades are continuously smoothly connected in the helical direction. Also, the rotor segments (14b, 15b, 16b, and 17b) with a small twist angle are combined so that the helical blades are continued with bends being formed at an angle with the helical blades of the rotor segments (14a, 15a, 16, and 17a) with a large twist angle positioned on the downstream side of the respective kneading blades in the extrusion direction.

Figure 3:
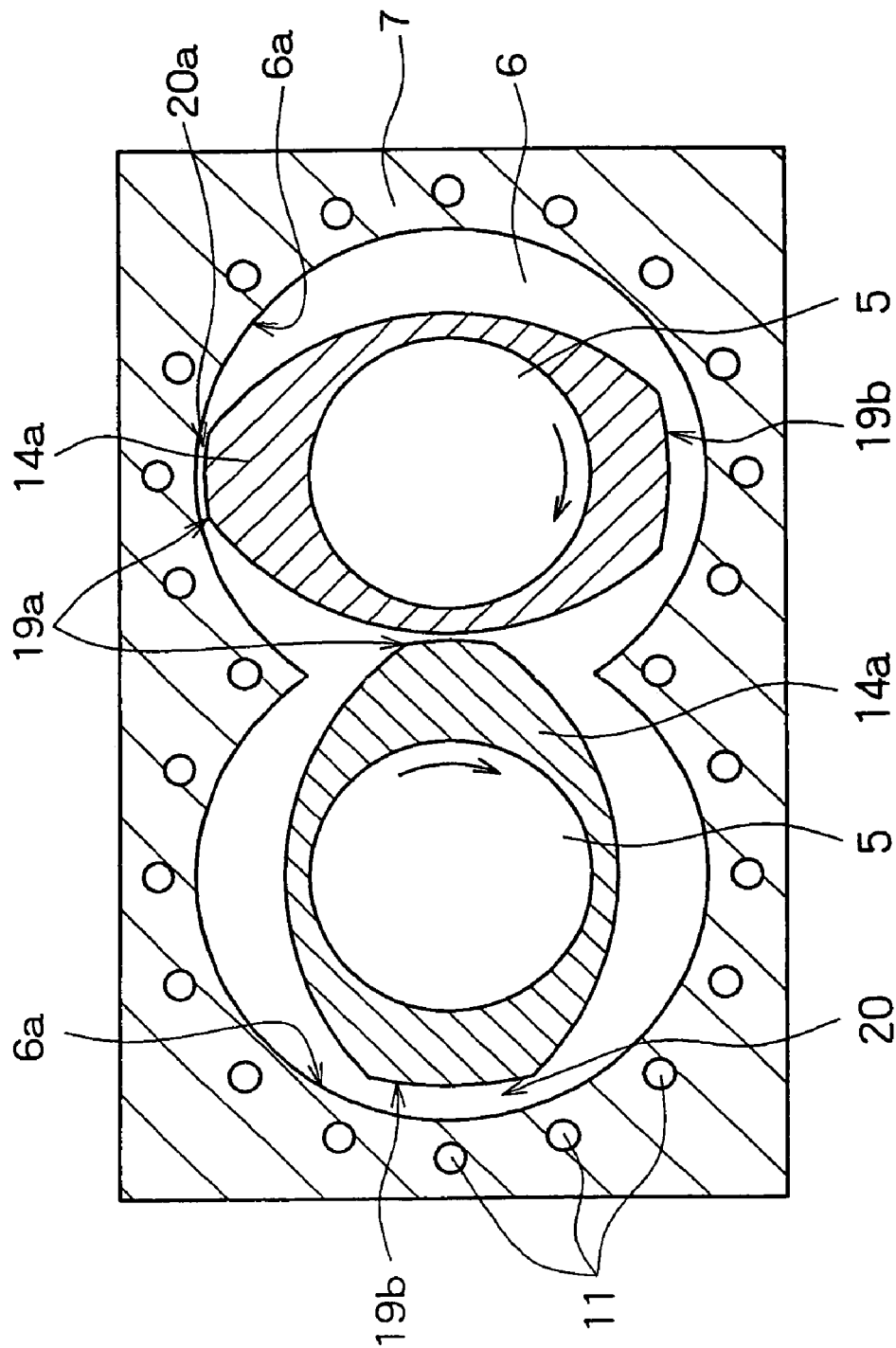
FIG. 3 is a sectional view taken along line III—III in FIG. 1.

FIG. 3 is a sectional view taken along line III—III in FIG. 1. As shown in FIG. 3, the rotor segments 14a are provided in each of the double-screw screw sets 5 so that they are rotated in a same direction while being engaged with each other (the rotational direction shown by an arrow in the drawing). Each of the rotor segments 14a comprises two helical blades, one of the helical blades having a high-level tip portion 19a, and the other having a low-level tip portion 19b. This construction applies to the rotor segments (15a to 18a) of the other kneading blades (12b to 12e).

The high-level tip portion 19a and the chamber inner wall 6a are close to each other to form a relatively narrow tip clearance 20a, while the tip clearance 20b formed between the low-level tip portion 19b and the chamber inner wall 6a becomes relatively wide. The tip clearances are formed to vary in size in the circumferential direction of the screw sets 5.

Also, as shown in FIG. 1, the high-level tip portions 19a and the low-level tip portions 19b are formed alternatively in the axial direction, and thus the tip clearances are also formed to vary in size alternatively in the axial direction.

In this manner, the tip clearances vary in size in the axial direction and the circumferential direction. Therefore, in the narrow tip clearances (20a), a strong shearing force can be applied to the material to be kneaded, while in the wide tip clearances (20b), passage of the material to be kneaded can be promoted, and a shearing function can be easily and uniformly applied to the material to be kneaded, thereby sufficiently kneading the material to be kneaded during transfer, and effectively using the whole length of the screw sets 5. Furthermore, the material to be kneaded is less localized in the chamber 6 to decrease a mechanical load on the screw sets 5. In the narrow tip clearances (20b), the material to be kneaded, adhering to the chamber inner wall 6a, is scraped out to improve a releasing property of the material to be kneaded in the kneading portions, thereby preventing residual of the material to be kneaded in the kneading portions.

The twist angles ($\alpha$, $\beta$) formed by the helical blades of the rotor segments (14 to 18) are preferably 45° or less. In this way, when the twist angles ($\alpha$, $\beta$) are set to a small value, the filling rate of the material to be kneaded in the kneading portions (12a to 12e) can be increased to facilitate application of a shearing force.

Figure 4:
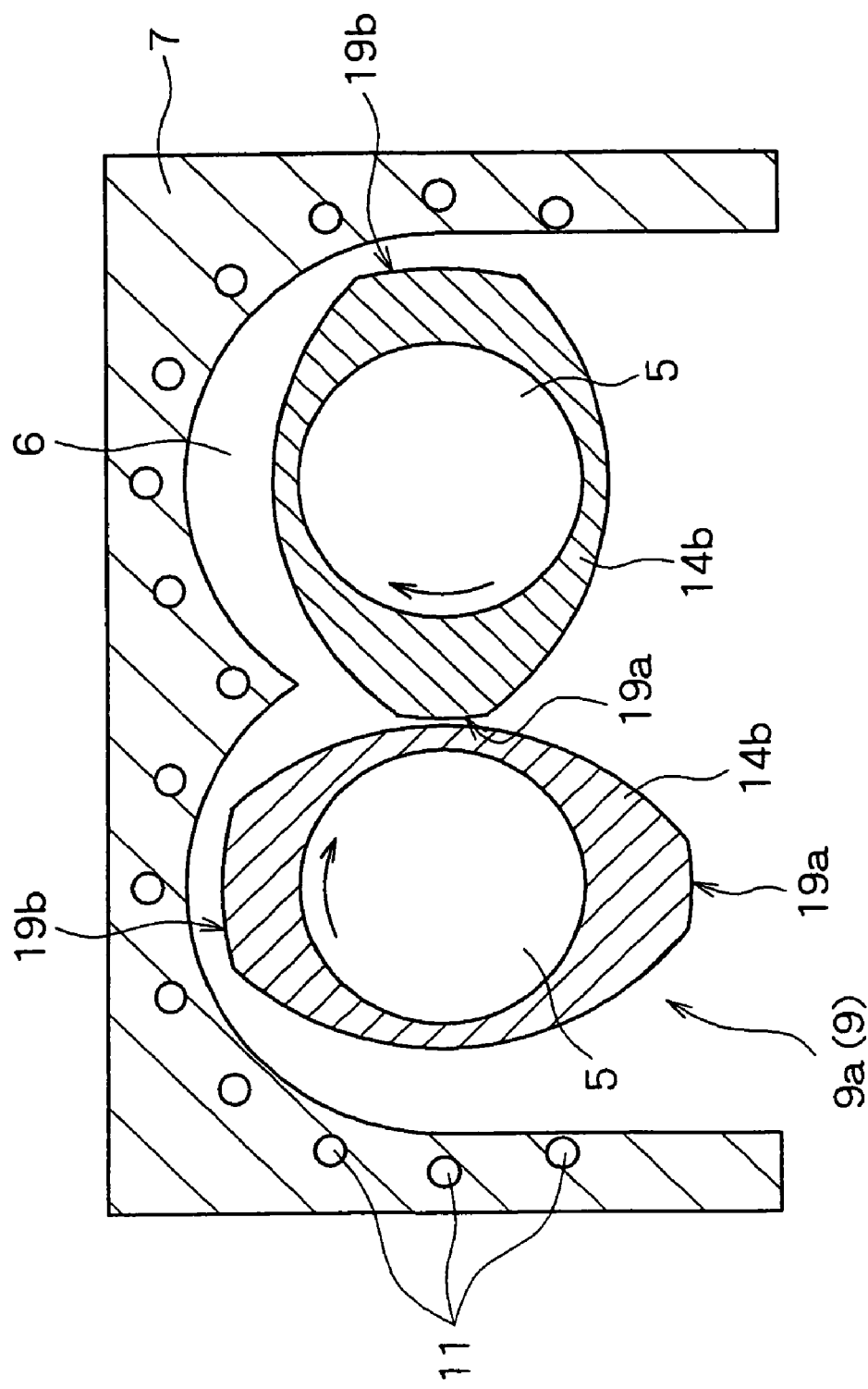
FIG. 4 is a sectional view taken along line IV—IV in FIG. 1.

FIG. 4 is a sectional view taken along line IV—IV in FIG. 1. As shown in FIG. 4, the discharge port 9a is provided below the rotor segment 14b positioned at the downstream end of the first kneading portion 12a in the extrusion direction. Similarly, the discharge ports (9b, 9c, and 9d) are provided on the downstream ends of the kneading portions (12b, 12c, and 12d), respectively.

The twist angle $\beta$ of each of the rotor segments (14b to 17b) respectively positioned above the discharge ports (9a to 9d) is set to be smaller than the twist angle $\alpha$ of each of the rotor segments (14a to 17a) on the upstream side so that a force to extrude it to the outside through the open discharge ports (9a to 9d) is higher than a force to extrude synthetic rubber in the axial direction. Therefore, in the open discharge port with the closing member 10 being removed, as shown in FIG. 5, the kneaded material is discharged, while in the closed discharge ports 9 with the closing member 10 being inserted, the kneaded material is extruded to the downstream side while being kneaded in the barrel 6.

In this manner, the discharge ports 9 are provided on the downstream sides of the kneading portions (12a to 12e) provided in plural steps, in the extrusion direction of the material to be kneaded, and the closing members 10 serving as the discharge position selecting means are inserted into or removed from the discharge ports 9 so that the kneaded material can be discharged from the discharge port 9 at a predetermined position in the axial direction. Namely, in a continuous kneading apparatus, the number of the steps of the kneading portions in which the material to be kneaded is passed can be selected according to the desired viscosity level and the desired dispersion degree of a compounding agent. Therefore, in producing a kneaded product of a rubber composition, the viscosity and the dispersion level of a compounding agent can be adjusted and controlled over a wide range, and continuous kneading can be performed to permit rationalization of a process for producing a kneaded material, i.e., improvement in productivity, and simplification, power saving and cost reduction of the producing process.

The double-screw kneading-extruder 2 is constructed as described above, and the material to be kneaded is supplied from the charging port 8, kneaded in the double-screw kneading extruder 2 until desired viscosity and dispersion level are obtained, and then discharged from any one of the discharge ports 9. As described above, rubber is supplied to the charging portion 8 provided at one end of the double-screw kneading extruder 2 by using the rubber feeder 3 provided above the charging port 8.

The rubber feeder 3 is a device for quantitatively supplying the sheet-shaped material to be kneaded to the double-screw kneading extruder 2, the device comprising a feeder roll 21 and a cutter roll 22.

The feeder roll 21 comprises a pair of rolls rotating in opposite directions, for transferring the sheet-shaped material to be kneaded while holding it between the rolls, and the feed roll 21 is rotated at various speeds by a driving device not shown so that the rubber sheet feed rate (feed rate per unit time) can be controlled.

The cutter roll 22 is disposed below the feeder roll 21, and comprises a pair of rolls rotating in opposite directions with the rubber sheet held therebetween, a cutter blade 22a being provided at a predetermined position of the circumference of the roll 22. Therefore, the rubber sheet is previously notched by the cutter blade 22a at each rotation of the cutter roll 22. Consequently, even when the rubber sheet is drawn by the screw segment 13 of the double-screw kneading extruder 2, the sheet is cut at the notch portion so that the material to be kneaded can be quantitatively supplied to the double-screw kneading extruder 2.

The kneading apparatus 1 comprises the lubricant supply means 4 for supplying a small amount of process oil serving as a lubricant into the chamber 6 of the double-screw kneading extruder 2, and a lubricant supply selecting means 23 for selecting the position where a small amount of process oil is supplied.

The lubricant supply means 4 comprises a tank 24 for storing the process oil, a supply passage 26 for connecting the tank 24 to each of the kneading portions (12b, 12c, 12d, and 12e), and a pump 25 for supplying the process oil through the supply passage 26. The supply passage 26 is connected to the barrel 7 at the uppermost stream sides of the kneading portions (12b to 12e) through branch passages (26a, 26b, 26c, and 26d), respectively.

The branch passages (26a to 26d) respectively comprise selector valves (23a, 23b, 23c, and 23d), which constitute the lubricant supply means 23. Namely, the selector valves (23a to 23d) are opened or closed to switch between supply and cut-off of a small amount of process oil to the kneading portions (12b to 12e), respectively, by the pump 25.

Therefore, each of the selector valves (23a to 23d) is switched so that a small amount of process oil can be supplied only to ones of the kneading portions (12b to 12e), which are positioned on the downstream side in the extrusion direction of the material to be kneaded, thereby preventing direct metal contact between the chamber inner wall 6a and each kneading blade or between the respective kneading blades in the kneading portions in which the material to be kneaded is not kneaded.

The construction of the kneading apparatus 1 according to this embodiment is described above. Next, the operation of the apparatus will be described below with reference to FIG. 1. First, various compounding agents such as a filler, for example, carbon black, and additives are added to the material to be kneaded, and the resultant mixture is formed into a sheet. Then, the sheet-shaped material to be kneaded is supplied into the chamber 6 of the double-screw kneading extruder 2 from the rubber feeder 3 through the charging port 8. The sheet-shaped material to be kneaded is quantitatively supplied into the chamber 6 through the feeder roll 21 and the cutter roll 22.

At this time, the pair of screw sets 5 is rotated in the same direction while being engaged with each other by the driving portion not shown in the drawing (refer to FIGS. 2 to 4). The material to be kneaded supplied into the chamber 6 is extruded to the first kneading portion 12a by the two helical blades provided on the screw segment 13.

In the first kneading portion 12a, the extruded material to be kneaded fills in the spaces between the kneading blades 14 and the chamber inner wall 6a to stay therein, and the material to be kneaded is fluidized, and mixed and dispersively kneaded with the applied shearing force in the tip clearances (20a and 20b) while filling in the clearances.

At this time, as described above, in the narrow wedge-shaped spaces formed by the high-level tip portion 19a and the chamber inner wall 6a and in the tip clearance 20a, a strong shearing force is applied to the material to be kneaded to promote a decrease in viscosity. In the tip clearance 20b formed between the low-level tip portion 19b and the chamber inner wall 6a, application of a uniform shearing force is promoted due to passage of the material to be kneaded through a high-shear region.

The material kneaded in the first kneading portion 14 reaches the rotor segment 14b positioned at its end, and when a sufficient kneading condition (a desired decrease in viscosity and a desired level of dispersion) is obtained by kneading only in the first kneading portion 14, the closing member 10 is removed from the discharge port 9a. Therefore, the kneaded product in a desired kneading state is discharged from the discharge port 9a (refer to FIG. 4).

At this time, the closing member 10 is inserted into each of the other discharge ports (9b, 9c, and 9d) respectively positioned at the downstream ends of the kneading portions in which kneading is not performed. Also, the pump 25 of the lubricant supply means 4 is operated, and the first selector valve 23a of the selector valves (23a to 23d) is opened. As a result, the process oil is supplied to each of the second kneading portion 12b and the subsequent kneading portions on the downstream side, in which kneading is not performed. Therefore, it is possible to prevent the occurrence of a high sound due to metal contact between the screw sets 5 and the barrel 7, and between the respective screw sets 5, or the occurrence of friction and baking due to galling.

The process oil supplied to each of the kneading portions in which kneading is not performed flows to the downstream side with rotation of the screw sets 5, and is discharged to the outside from the end of the barrel 7. The process oil discharged from the end of the barrel 7 is returned to the tank 24 after foreign materials are removed, and then re-used.

When a sufficient decrease in viscosity and dispersion degree of the compounding agents are not obtained by kneading only in the first kneading portion 12*a*, the closing member 10 is inserted into the discharge port 9*a*, and kneading is performed in the second kneading portion 12*b* and the subsequent kneading portions. As described above, at this time, the number of the steps of the kneading portions used for kneading is selected so that only the discharge port 9 of the selected kneading portion is opened to discharge the kneaded product in a desired kneading state from the discharge port 9.

At this time, the selector valves 23 provided on the branch passages connected to the upstream side of the discharge port 9 of the selected kneading portion are closed, while the selector valve provided on the first one of the branch passages connected to the down stream side of the selected discharge port 9 is opened. Therefore, the process oil is supplied to the kneading portions in which kneading is not performed.

When all the kneading portions (12*a* to 12*e*) must be used for kneading, all the discharge ports (9*a* to 9*d*) are closed so that the kneaded product is extruded from the end of the barrel 7 (the end of the barrel unit 7*e*).

The operation of the rubber composition kneading apparatus 1 according to the embodiment is described above. However, the means, for controlling the viscosity and the dispersion degree of the compounding agents is not limited to the means for changing the discharge position of the kneaded product, and the viscosity and the dispersion degree may be finely controlled by changing the rotational speed of the screw sets 5.

The above description of the embodiment can be applied to a method of kneading a rubber composition according to an embodiment of the present invention.

Embodiments are not limited to the above-described embodiment, and for example, following modifications can be made.

(1) Although the above-described embodiment uses a closing member as a discharge position selecting means, the selecting means is not limited to this, and the present invention can be applied to various types such as a shutter type and door type as long as the closed and open states can be switched.

(2) Although the above-described embodiment uses a rotor segment comprising two helical blades as a kneading blade, the present invention can be applied to a rotor segment comprising three helical blades.

(3) Although the above-described embodiment uses an extruder comprising five steps of kneading portions, the number of the steps of the kneading portions is not limited to 5, and the number of the steps may be 4 or less, or 6 or more. Alternatively, a long, continuous, single kneading portion may be used. In the case of a long, continuous kneading portion, the present invention can be applied when a plurality of discharge ports are provided in the longitudinal direction.

(4) Although, in the above-described embodiment, the kneading portions are continuously combined, a combination is not limited to this, and a screw segment may be provided between any desired kneading portions. Also, a kneading disk may be combined with rotor segments.

(5) Although, in the above-described embodiment, each of the kneading portions comprises a combination of five rotor segments, a combination is not limited to this, and four or less rotor segments, or six or more rotor segments may be combined. With respect to the twist angles formed by the helical blades of each of the rotor segments, any desired combination of twist angles may be used for each rotor segment.

(6) Although the above-described embodiment uses a single-stage feeder roll as a rubber feeder, the supply device is not limited to this, and a multi-stage feeder roll may be provided. The rubber feeder is not limited to the feeder roll, and an extrusion screw type (single-screw extrusion screw, double-screw taper screw feeder, or the like), a gear pump, and the like may be used. The shape of the material to be kneaded, which is supplied, is not limited to a sheet, various shapes such as a ribbon, a block, a powder, and the like may be used as long as the material to be kneaded can be continuously supplied.

(7) Although, in the above-described embodiment, a means for supplying a small amount of process oil is used as a lubricant supply means, the means is not limited to this, and a means for supplying a small amount of rubber can exhibit the same effect as the present invention.

(8) Although, in the above-described embodiment, the material to be kneaded, comprising various compounding agents, is supplied to a kneading extruder, the compounding agents are not necessarily previously added to raw material rubber, and the raw material rubber and the compounding agents may be separately supplied to the kneading extruder. In this case, a quantitative rubber feeder and a quantitative feeder for each of various compounding agents must be provided.

Figure 7:
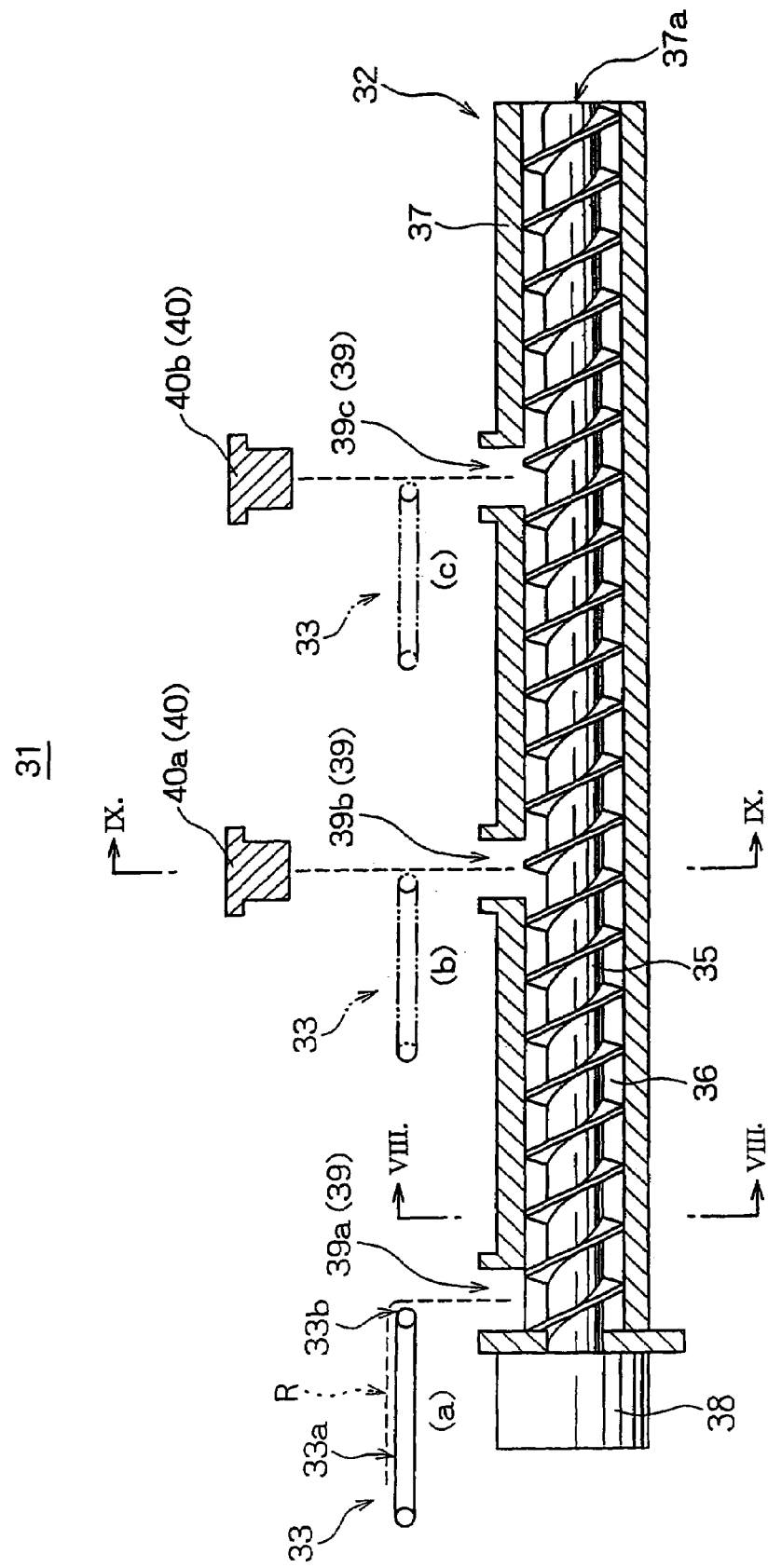
FIG. 7 is a schematic sectional side view of a kneading apparatus according to an embodiment of the present invention.

Another embodiment of the present invention will be described below with reference to the drawings. FIG. 7 is a schematic sectional side view showing a rubber composition kneading apparatus 31 according to this embodiment. As shown in FIG. 7, the kneading apparatus 31 comprises a codirectional rotation-engagement type of double-screw kneading extruder 32, and a rubber feeder 33 for supplying a rubber material to be kneaded, comprising rubber or rubber containing various compounding agents, to the double-screw kneading extruder 32. A method of kneading a rubber composition according to this embodiment comprises kneading rubber or the like by using the kneading apparatus 31.

First, the kneading apparatus 31 is described. The double-screw kneading extruder 32 provided in the kneading apparatus 31 comprises a pair of screw sets 35, and a barrel 37 having a chamber 36 serving as a cylindrical cavity in which the screw sets 35 are rotated. The pair of screw sets 35 is arranged in parallel in the axial direction to overlap with each other, as shown in a side view of FIG. 7. Also, the pair of screw sets 35 is connected to a driving portion 38 (shown on the left side of the drawing), which is provided at one end of the barrel 37, and which comprises a motor and reduction gear not shown in the drawing, so that the screw sets 35 are rotated in a same direction. The barrel 37 comprises the chamber 36 formed as a cylindrical cavity having a cocoon-like sectional shape, the pair of screw sets 35 being contained in the chamber 36 (refer to a sectional view of FIG. 8, taken along line VIII—VIII in FIG. 7).

The barrel 37 also comprises charging ports 39 (39*a*, 39*b*, and 39*c*) provided at a plurality of positions with spaces in the longitudinal direction of the chamber 36, for loading the material to be kneaded, the material comprising rubber or rubber containing various compounding agents such as a filler, additives, etc. The material to be kneaded, which is supplied from the rubber feeder 33 described below through any one of the charging ports 39 is extruded rightward in the drawing in the axial direction, and continuously kneaded by rotation of the screw sets 35 in the chamber 36.

When each of the charging ports 39 (39a, 39b, and 39c) is not used as a charging port for material to be kneaded, a cover member 40 (40a and 40b) is fitted into each charging port 39. When the charging port 39a is used, while the other charging ports (39b and 39c) are not used, the corresponding cover members 40b and 40c are fitted into the charging ports 39b and 39c, respectively, as shown in FIG. 7. FIG. 9 is a sectional view taken along line IX—IX in FIG. 7, and shows a state in which the cover member 40a is fitted into the charging port 39b. As shown in FIG. 9, in the portion in which the cover member 40 is fitted into the charging port 39, the chamber 36 is formed to have the same cocoon-like sectional shape as that shown in a sectional view of FIG. 8 taken along line VIII—VIII.

When the material to be kneaded is desired to be supplied through the charging port 39b, the cover members 40a and 40b are fitted into the charging ports 39a and 39c, respectively. Similarly, when the material to be kneaded is desired to be loaded through the charging port 39c, the cover members 40a and 40b are fitted into the charging ports 39a and 39b, respectively. When the material to be kneaded is desired to be supplied through the charging ports 39b and 39c other than the charging port 39a on the uppermost stream side, a small amount of the same material as the material to be kneaded may be supplied through the charging port 39a on the uppermost stream side, in order to lubricate the screw sets. This decreases interference between the screw sets 35 and the barrel 37.

Figure 8:
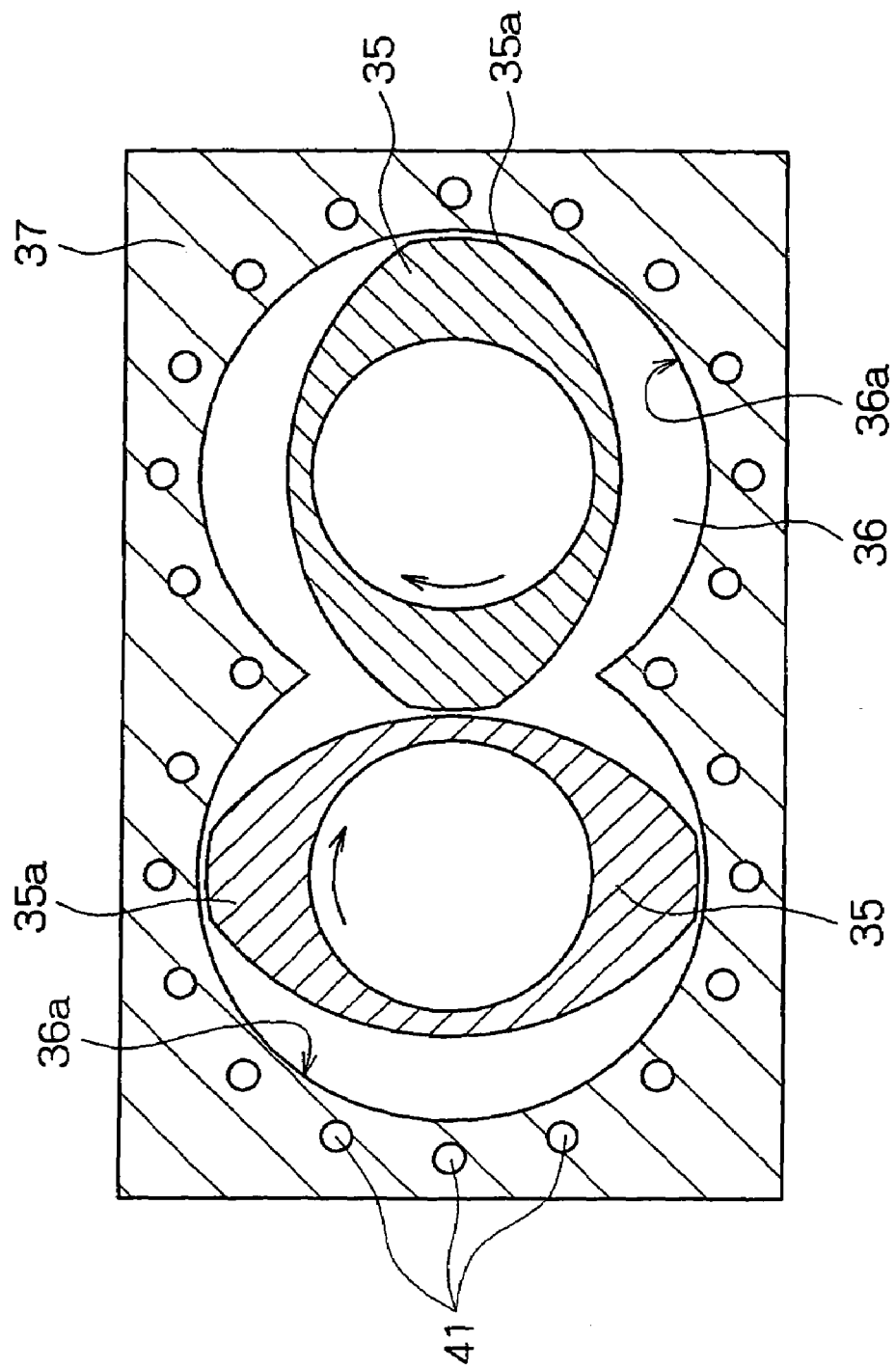
FIG. 8 is a sectional view taken along line VIII—VIII in FIG. 7.
Figure 9:
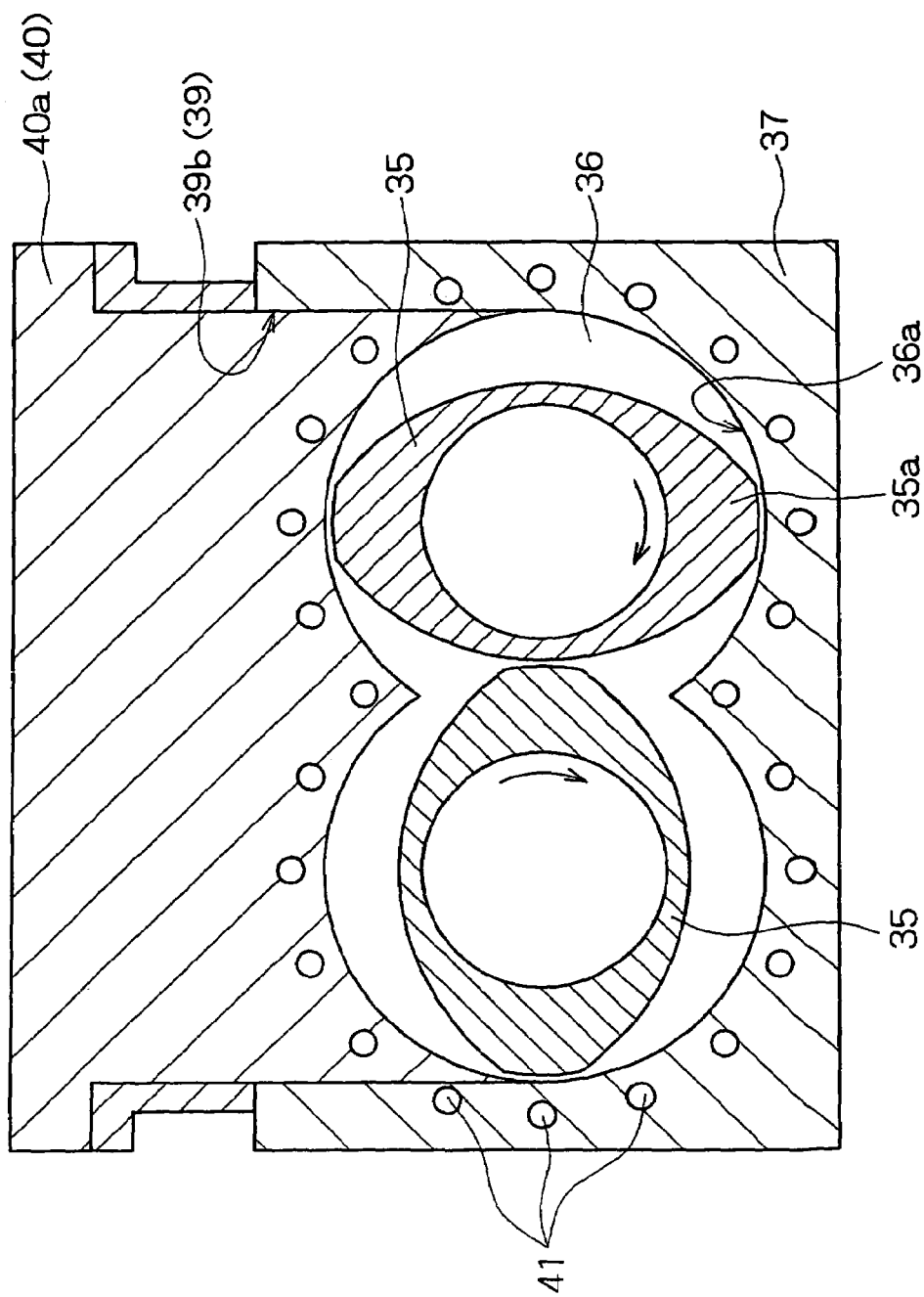
FIG. 9 is a sectional view taken along line IX—IX in FIG. 7.

As shown in each of the sectional views of FIG. 8 (taken along line VIII—VIII) and FIG. 9 (taken along line IX—IX), the barrel 37 comprises a plurality of cooling paths 41 provided in the barrel 37 to surround the chamber 36. The cooling paths 41 are formed as through holes to extend along the longitudinal direction of the chamber 36. By passing a cooling medium such as cooling water through the cooling paths 41, the barrel 37 is kept at low temperature, and heat is removed from the material to be kneaded through the inner wall 36a of the chamber 36, thereby suppressing heating of the material to be kneaded to a high temperature. As shown in FIG. 9, through holes are provided in each of the cover members 40 to form the cooling paths 41 in correspondence with the barrel 31.

In kneading a high-viscosity rubber composition, the temperature of the rubber is easily increased to high temperature due to heat generated during kneading. Particularly, in the case of a rubber or elastomer material, the temperature of the material under treatment must be generally kept down to 160 to 180° C. (depending on the material used) in order to prevent thermal deterioration. Therefore, during kneading, cooling by the cooling paths 41 is required. A rubber or elastomer material has the property of less radiating heat, and thus has an aspect in which it is used as, for example, a heat insulator. Therefore, during kneading of a rubber or elastomer material, cooling is an important factor of the process.

Although not shown in the drawings, the barrel 37 comprises a plurality of units which are combined in the axial direction. The arrangement of the units can be changed so that a desired number of charging ports 39 can be disposed at desired positions. Also, the end 37a of the barrel 37 is open to the air so that the kneaded bulk product is discharged from the end 37a. Furthermore, a die may be connected to the end 37a so as to discharge the kneaded product which is molded into a predetermined sectional shape.

Although not shown in the drawing, each of the screw sets 35 comprises a plurality of screw segments combined in the axial direction of the screw sets 35 (simply referred to as the "axial direction" hereinafter). As seen from the sectional views of FIGS. 8 and 9, each of the screw segments of the screw sets comprises a double-thread helical blade. The helical blade is provided so that the tip 35a of the helical blade is brought near to the chamber inner wall 36a to form a narrow clearance, thereby improving biting of the material to be kneaded. In the spaces formed between the screw sets 35 and the chamber inner wall 36a, the material to be kneaded is kneaded under a shearing force, and extruded to the downstream side.

The material to be kneaded is supplied to the chamber 36 by the rubber feeder 33 which comprises an endless conveyor belt 33a driven to move round. The material R to be kneaded, which comprises a rubber material formed in a strip ribbon, and which is loaded on the conveyor belt 33a, is quantitatively transferred toward the charging port 39 with the round movement of the conveyor belt 33a. The material to be kneaded is dropped from the transfer end 3b of the rubber feeder 33, and supplied to the chamber 36. The rubber feeder 33 is a quantitative supply means in which the feeding rate (feed per unit time) of quantitative feeding of the strip ribbon-shaped material R to be kneaded from the charging port 39 can be controlled by controlling the round driving rate of the conveyor belt 33a.

FIG. 7 shows an example (position (a) in the drawing) in which the transfer end 33b of the rubber feeder 33 is positioned above the charging port 39a provided at the uppermost stream side of the barrel 37, as shown by a solid line. When the material to be kneaded is desired to be supplied from the charging ports 39b or 39c, the rubber feeder 33 may be moved in the axial direction and disposed at position (b) or position (c), as shown by dotted line in FIG. 7.

As described above, the double-screw kneading extruder 32 comprises a plurality of charging ports 39 (39a, 39b, and 39c), and one of the charging ports 39 can be selected for supplying the material to be kneaded. Therefore, the material to be kneaded is kneaded in a region from the selected charging port to the end 37a. Namely, even in continuous kneading, the length of passage of the material to be kneaded through the chamber 36 can be changed by appropriately selecting the charging port 39, and thus an amount of kneading work corresponding to a desired viscosity level and a desired dispersion level of the compounding agents can be imparted to the material to be kneaded, to achieve a desired kneading condition. Therefore, in producing a rubber composition, the viscosity and the dispersion level of the compounding agents can be adjusted or controlled over a wide range.

A method of kneading a rubber composition according to this embodiment will be described below. The kneading method of this embodiment is performed by using the kneading apparatus 31, and comprises successively treating the material to be kneaded in the rubber supply step, the rubber kneading step, and the rubber discharge step, to produce a kneaded product.

First, the rubber supply step will be described. In FIG. 7, one of the plurality of charging port 39 is selected according to the type of the material to be kneaded, the desired viscosity level, and the desired dispersion level of the compounding agents. Therefore, the length of passage of the material to be kneaded through the chamber 36 can be determined so that an amount of kneading work imparted to the material to be kneaded can be controlled.

Then, the rubber feeder 33 as the means for supplying the material to be kneaded is disposed so that the transfer end 33*b* is positioned above the selected charging port 39. FIG. 7 shows a state in which the charging port 39*a* is selected. When the charging port 39*a* is selected, the material to be kneaded is kneaded over the entire length of the chamber 36. When an amount of kneading work desired to be imparted to the material to be kneaded may be small (when only a small decrease in viscosity is required), the charging port 39*b* or 39*c* other than the charging port 39*a* may be selected. For the other charging ports 39 not selected, the cover member 40 is provided.

After the rubber feeder 33 is disposed, the material to be kneaded, which comprises rubber or rubber containing various compounding agents such as a filler such as carbon black, and additives, etc., is supplied from a hopper not shown in the drawing. Although FIG. 7 shows an example in which the material R to be kneaded, which is formed in a strip ribbon, is supplied to the double-screw extruder 32, the material to be kneaded, which is formed, for example in chips, may be supplied. Alternatively, a feeder roll or cutter roll not shown in the drawing may be provided above the rubber feeder 33 so that a sheet- or ribbon-shaped material to be kneaded may be supplied to the rubber feeder 33 while being cut into an appropriate length (or appropriate size).

Then, the material R to be kneaded, which is loaded on the conveyor belt 33*a*, is transferred to the charging port 39 (39*a* in FIG. 7) by the round movement of the conveyor belt 33*a*. The material R to be kneaded is dropped from the transfer end 33*b*, and supplied to the chamber 36. At this time, the temperature of the material R to be kneaded is controlled to 65° C. or less. Consequently, a shearing force can be effectively applied to the material to be kneaded, thereby efficiently decreasing the viscosity, and achieving a high efficiency of kneading. This embodiment uses the feeder comprising the conveyor belt 33*a* as the rubber feeder. However, when an extrusion screw type of quantitative rubber feeding means is used, it is very important to control the temperature to 65° C. or less. Namely, in an extrusion screw type, the accuracy of quantitative feeding deteriorates unless the temperature of the material to be kneaded, which supplied to the double-screw kneading extruder, reaches a temperature permitting plasticization. Therefore, in some cases, the material to be kneaded is supplied to the double-screw kneading extruder at a temperature higher than room temperature. In this case, if the temperature of the material to be kneaded is kept at 65° C. or less, the kneading efficiency can be prevented from deteriorating due to excessive increase in temperature. Therefore, a kneaded product with stable quality can be efficiently produced.

After the above-described rubber supply step is completed, the material to be kneaded is kneaded in the next rubber kneading step until a desired kneading condition is obtained. The material to be kneaded is kneaded by rotating the double-screw sets 35 in the same direction by the rotation-driving portion 38 (refer to FIG. 8). Namely, the material to be kneaded is kneaded under a shearing force in the space formed between the screw sets 35 and the chamber inner wall 36*a*. Also, the helical blade formed on the screw sets 35 impart a kneading work due to a shearing force to the material to be kneaded, and extrude the material to be kneaded toward the end 37*a* of the barrel 37 on the downstream side (the right side of the figure). In this kneading step, the material to be kneaded is cooled with a cooling medium such as cooling water which flows through the cooling paths 41 formed in the barrel 31 in the axial direction, through the chamber inner wall 36*a* and the barrel 37. As a result, the material to be kneaded is prevented from thermally deteriorating due to excessive increase in temperature. It is also possible to prevent deterioration in the kneading efficiency due to a phenomenon that the viscosity is decreased due to an increase in temperature to fail to apply a sufficient mechanical shearing force to the material to be kneaded.

After the above-described kneading step is completed, the material to be kneaded is discharged from the end 37*a* of the barrel 37 (rubber discharge step), to obtain a kneaded product controlled to a desired kneading condition.

Although, in the above-described method of kneading the rubber composition according to this embodiment, the viscosity and the dispersion degree of the compounding agents are controlled by selecting the loading position of the material to be kneaded, the control means is not limited to this. The viscosity and the dispersion degree can be finely controlled by further changing the rotational speed of the screw set 35.

When the rubber composition is kneaded-by-using the kneading apparatus 31, the kneading method is not limited to the above-described method. A predetermined compound agent may be separately supplied to the double-screw kneading extruder 32 so that timing of mixing of the compounding agent with the material to be kneaded can be appropriately controlled.

Figure 10:
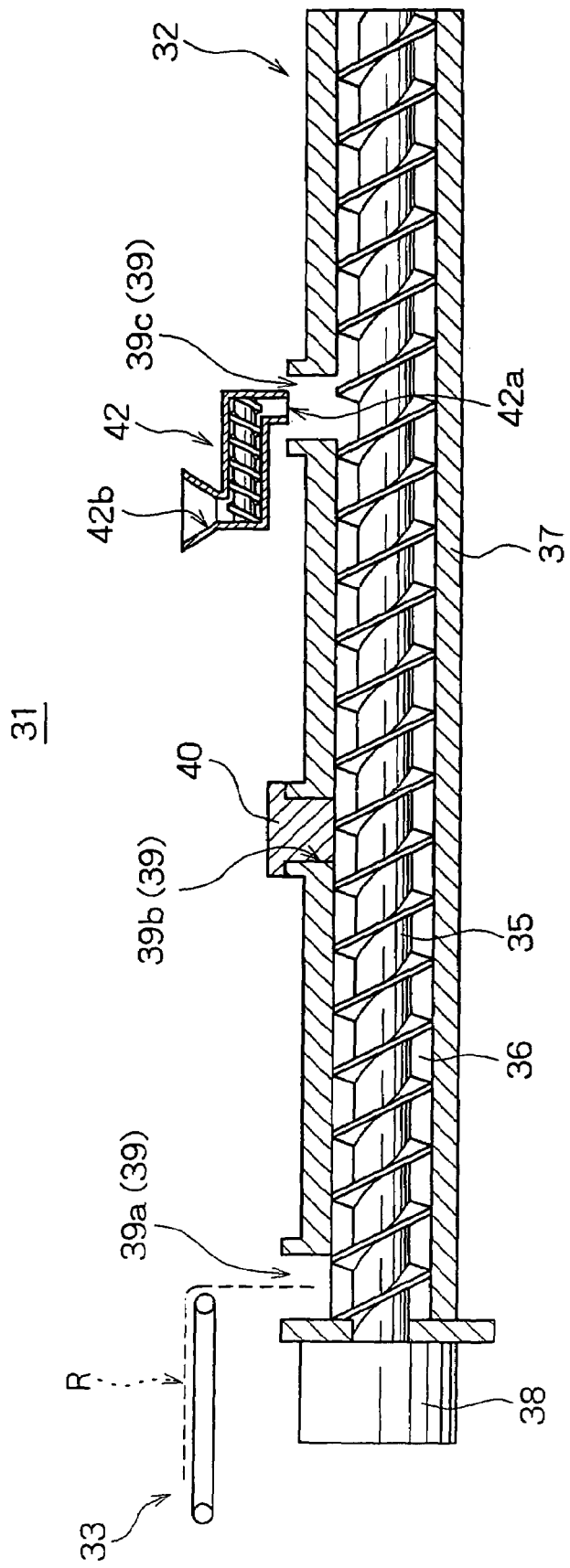
FIG. 10 is a schematic sectional side view of a kneading apparatus for kneading a rubber composition according to another embodiment of the present invention.

FIG. 10 shows a state in which a predetermined compounding agent is supplied to the chamber 36 by using a compounding agent feeder 42. In this case, the material R to be kneaded is supplied to the charging port 39*a* from the rubber feeder 33, and the cover member 40 is fitted into the charging port 39*b*. The discharge port 42*a* of the extrusion screw type of compounding agent feeder 42 is open to the charging port 39*c* positioned on the downstream side of the charging port 39*a* to which the material to be kneaded is supplied, in the extrusion direction. Namely, the predetermined compounding agent supplied from the hopper 42*b* of the compounding agent feeder 12 is quantitatively supplied to the chamber 36 by an extrusion screw through the charging port 39*c*. Therefore, the compounding agent is mixed with the material to be kneaded, which is kneaded while passing through the chamber 36 from the charging port 39*a* to the charging port 39*c*.

In a case in which a compounding agent is preferably mixed with the rubber composition in a predetermined state in the course of kneading, the case can easily be achieved by the above-described kneading method. For example, when a compounding agent such as a cross-linking chemical or a cross-linking accelerator, which has a different limit temperature in kneading from those of other chemicals and compounding agents, is mixed as a compounding agent, the method is effective.

In order to describe the effect of the present invention in detail, the present invention will be described in further detail below with reference to an example. The example below is just an example of application of the present invention.

EXAMPLE

In this example, experiment of production of a kneaded product was conducted by using the kneading apparatus 31

(refer to FIG. 7) according to the embodiment of the present invention. As the double-screw kneading extruder 32, an extruder having a screw diameter of 59 mm, and a ratio (L/D) of the length of the screw set 35 to the screw diameter of 36 was used. In the description below, the axial length of the barrel 37 is represented by a L/D value (for example, a portion with a L/D of 48 from the upstream side of the barrel 37 represents a middle position of the barrel 37 in the axial direction). During kneading, cooling water was passed through the cooling liquid paths 41 provided in the barrel 37 so that the barrel temperature was controlled to be maintained at about 30° C. during kneading, and a kneaded product was discharged as a block from the end 37a of the barrel 37.

As the position of the charging port 39 for supplying the material to be kneaded, the charging portion 39a positioned on the upstream side of the barrel 37, and the charging port 39c at a position with a L/D of 25.2 from the upstream end were selected. The material to be kneaded is supplied through each of the charging ports, and a decrease in Mooney viscosity was measured. In this example, the screw rotational speed was 300 rpm, the temperature of the material (rubber material) to be kneaded was 25° C., and the supply rate was 150 kg/hr. The results are shown in Table 1.

TABLE 1

| Feed position | L/D length of passage of rubber material | Decrease in Mooney viscosity |
|---|---|---|
| Charging port 9a | 36 | 35 points |
| Charging port 9c | 10.8 | 12 points |

Table 1 indicates that by using the kneading apparatus 31, the length of passage of the material to be kneaded through the barrel can be changed by appropriately selecting the charging port, so that a decrease in Mooney viscosity can be controlled in a range of 23 points. For comparison, the Mooney viscosity was controlled by changing the rotational speed of the screw and the supply rate of the rubber material. As a result, a decrease in Mooney viscosity could be controlled only in a range of 14 points at maximum because of a minimum limit of production, which must be secured as an equipment specification, and a limit of the material temperature. Therefore, it is confirmed to be effective that the viscosity is controlled by changing the length of passage through the barrel. Also, in another comparative example, a decrease in Mooney viscosity was controlled by changing the configuration of a screw segment. As a result, a decrease in Mooney viscosity could be controlled in the range of 20 points. However, stopping of the apparatus to change the screw segment requires a long time, and thus this method is though to be difficult to apply to actual production. From this viewpoint, the effectiveness of the present invention is confirmed.

In order to compare the effects obtained by using rubber raw materials (material to be kneaded) at different feed temperatures, a decrease in Mooney viscosity was measured by variously changing the feed temperature. In measurement, the configuration of the screw segments of the kneading apparatus 31 was partially changed. Table 2 shows the results of measurement at each of 25° C., 60° C. and 140° C. The other experiment conditions were the same as experiment producing the results shown in Table 1.

TABLE 2

| Feed temperature | L/D length of passage of rubber material | Decrease in Mooney viscosity |
|---|---|---|
| 25° C. | 10.8 | 20 points |
| 25° C. | 28.8 | 40 points |
| 60° C. | 10.8 | 20 points |
| 60° C. | 28.8 | 40 points |
| 140° C. | 10.8 | 20 points |
| 140° C. | 28.8 | 21 points |

Table 2 indicates that in measurement at a feed temperature of each of 25° C. and 60° C., a decrease in Mooney viscosity could be controlled in a range of 20 points. Also, there was no difference between the decreases in Mooney viscosity at feed temperatures of 25° C. and 60° C. However, at a feed temperature of 140° C., when the length L/D of passage of the rubber material was a higher value of 28.8, a decrease in Mooney viscosity was small, and it was thus confirmed that the kneading efficiency was lower than that of the case of loading temperatures of 25° C. and 60° C. In this case, the temperature was consequently increased to a limit temperature causing a fear of deterioration in rubber. This is possibly due to the fact that the kneading efficiency is significantly decreased due to an excessive increase in temperature. The above experiment results reveal that when the loading temperature is 60° C. or less, and the loading temperature is 65° C. or less in consideration of temperature variations in control of the production line, a high kneading efficiency can be maintained, and a kneaded product with stable quality can be obtained.

Although the embodiment of the present invention is described with reference to the example, the method and apparatus for kneading the rubber composition according to the present invention are not limited to the above embodiment. For example, following modifications may be made.

Figure 11:
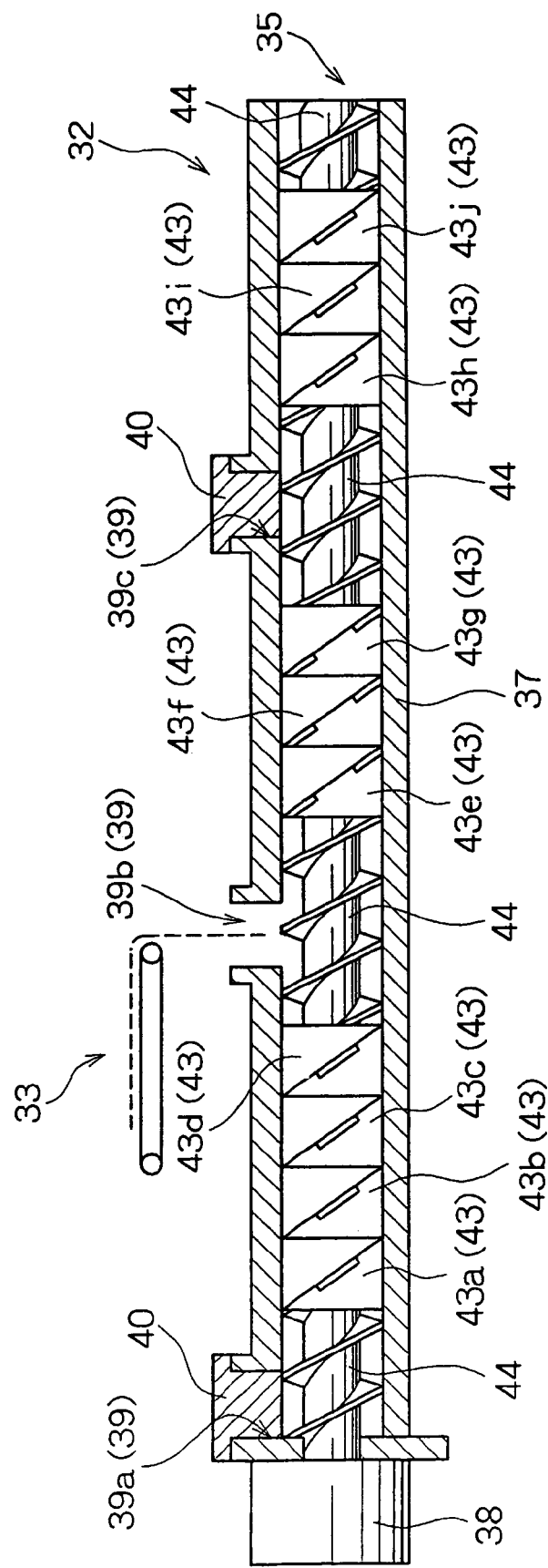
FIG. 11 is a schematic sectional side view of a kneading apparatus according to a modified embodiment of the present invention.

(1) Although, in this embodiment, a screw set comprises a combination of only screw segments, the screw set is not limited to this, and the present invention can be applied to any combination with rotor segments or kneading disks. For example, as shown in FIG. 11, the screw sets 35 may comprise a combination of a plurality of rotor segments 43 (43a to 43j) and the screw segments 44. In this case, by using the rotor segments 43, a strong shearing force can be applied to a material to be kneaded to achieve a high kneading efficiency. In FIG. 11, the same components as the kneading apparatus of the above embodiment are denoted by the same reference numerals.

(2) Although, in this embodiment, the kneading apparatus 1 comprises charging ports provided at three positions, the number of the charging ports is not limited to this, and the charging ports may be provided at two positions or four positions in the axial direction of the screw sets. The positions of the charging ports can be variously selected.

(3) Although, in this embodiment, the rubber feeder comprises a conveyor belt, the rubber feed is not limited to this, and a feeder comprising a feeder roll, an extrusion screw type (single-screw extrusion screw or double-screw taper screw feeder), or a feeder comprising a gear pump may be used. By using such a quantitative feeder, no variation occurs in supply of rubber and other compounding agents, thereby suppressing variations in quality and physical properties of a kneaded product. Namely, the variations can easily be decreased to an allowable limit or less (for example, hardness $\sigma_{n-1}=3.0$ or less) for product control.

(4) Although, in this embodiment, the material to be kneaded, which is supplied from the charging ports, has a strip ribbon, the present invention can be applied to materials to be kneaded having other shapes. For example, a ribbon-, chip-, powder- or sheet-shaped material may be used. When a material to be kneaded, having such a shape, is supplied, the material to be kneaded can be quantitatively supplied from the charging ports. Therefore, it is possible to prevent the occurrence of variations in quality and physical properties of a kneaded product due to variations in supply of rubber and other compounding agents to a kneading extruder.

We claim:

1. A kneading apparatus for kneading by fluidizing a material to be kneaded under a shearing force to obtain a kneaded product in a desired kneaded state comprising:
   a barrel having a cylindrical cavity chamber;
   a double-screw screw set rotating in said chamber to knead the material to be kneaded under a shearing force and extrude the material to be kneaded to the downstream side;
   a plurality of kneading blades combined with said screw set, for kneading the material to be kneaded in a wedge-shaped space between the inner wall of said chamber and said screw set and in a tip clearance;
   charging ports provided at a plurality of positions of said barrel, for supplying the material to be kneaded into said chamber;
   a feeder for supplying the material to be kneaded through a selected one of said plurality of charging ports; and
   at least one cover member adapted to be fitted to at least one of said plurality of charging ports other than said selected one of said charging ports, wherein the at least one cover member is shaped to conform to the shape of said cavity chamber when the at least one cover member is fitted to said at least one of said plurality of charging ports.

2. The kneading apparatus according to claim 1, wherein a cooling path is provided around said chamber.

3. A kneading method by using a kneading apparatus comprising a barrel having a cylindrical cavity chamber; a double-screw screw set rotating in said chamber to knead the material to be kneaded under a shearing force and extrude the material to be kneaded to the downstream side; a plurality of kneading blades combined with said screw set, for kneading the material to be kneaded in a wedge-shaped space between the inner wall of said chamber and said screw set and in a tip clearance; charging ports provided at a plurality of positions of said barrel, for supplying the material to be kneaded into said chamber; a feeder for supplying the material to be kneaded through a selected one of said plurality of charging ports; and at least one cover member adapted to be fitted to at least one of said plurality of charging ports other than said selected one of said charging ports, the method comprising:
   a supply step of supplying a material to be kneaded into the chamber through a selected one of said plurality of charging ports, which is selected according to a desired kneading condition;
   a step of providing said at least one cover member to at least one of said plurality of charging ports other than said selected one of said charging ports;
   a kneading step of kneading the material to be kneaded under a shearing force in a space between said screw set and the inner wall of said chamber, and extruding the material toward the downstream side; and
   a discharge step of discharging a kneaded product from a downstream end of said barrel.

4. The kneading method according to claim 3, including the steps of supplying a predetermined compounding agent to said chamber via a charging port downstream of the selected charging port in the extrusion direction and mixing the compounding agent with the material to be kneaded.

5. The kneading method according to claim 3, wherein the material to be kneaded is rubber or rubber compounds.

6. The kneading method according to claim 5, wherein said supply step comprises supplying the material to be kneaded, which is adjusted to a temperature of 65° C. or less.

7. The kneading method according to claim 5, wherein the supply step comprises supplying the material to be kneaded, which is formed in a ribbon, a strip ribbon, or a chip.

8. The kneading method according to claim 3, wherein the supply step comprises supplying the material to be kneaded, by using a quantitative supply means.

* * * * *

UNITED STATES PATENT AND TRADEMARK OFFICE
CERTIFICATE OF CORRECTION

PATENT NO. : 7,083,320 B2  Page 1 of 1
APPLICATION NO. : 11/050723
DATED : August 1, 2006
INVENTOR(S) : Murakami et al.

It is certified that error appears in the above-identified patent and that said Letters Patent is hereby corrected as shown below:

On the title page, Item (73), the Assignee information is incorrect. Item (73) should read:

-- (73)   Assignee:    Kabushiki Kaisha Kobe Seiko Sho
(Kope Stell, Ltd.), Kobe (JP)   --

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 7,083,320 B2 Page 1 of 1
APPLICATION NO. : 11/050723
DATED : August 1, 2006
INVENTOR(S) : Murakami et al.

It is certified that error appears in the above-identified patent and that said Letters Patent is hereby corrected as shown below:

On the title page, Item (73), the Assignee information is incorrect. Item (73) should read:

-- (73)    Assignee:    Kabushiki Kaisha Kobe Seiko Sho
                        (Kobe Steel, Ltd.), Kobe (JP) --

This certificate supersedes the Certificate of Correction issued October 31, 2006.

Signed and Sealed this

Seventh Day of April, 2009

JOHN DOLL
*Acting Director of the United States Patent and Trademark Office*